US005400501A

United States Patent [19]

Marshall

[11] Patent Number: 5,400,501

[45] Date of Patent: Mar. 28, 1995

[54] CLIP FASTENING DEVICE

[76] Inventor: Forrest A. Marshall, P.O. Box 649, Dublin, Ga. 31021

[21] Appl. No.: 110,547

[22] Filed: Aug. 23, 1993

[51] Int. Cl.[6] .......... B23P 11/00; B23Q 7/10

[52] U.S. Cl. .......... 29/814; 29/243.56; 29/270; 29/509; 227/129

[58] Field of Search .......... 29/809, 814, 816, 243.5, 29/243.56, 243.58, 275, 278, 270, 509; 227/129, 134, 147, 155

[56] References Cited

U.S. PATENT DOCUMENTS

| | | | |
|---|---|---|---|
| 563,542 | 7/1896 | Allshouse | 29/243.58 |
| 2,011,105 | 10/1935 | Hanney | 29/243.58 X |
| 2,176,116 | 10/1939 | Baetzhold et al. | 29/809 |
| 2,585,807 | 2/1952 | Mackechine, Jr. | 227/155 |
| 2,741,765 | 4/1956 | Bruggmann | 29/243.58 |
| 2,897,504 | 8/1959 | Shapiro | 29/243.56 |
| 3,279,046 | 10/1966 | Shapiro | 29/243.56 |
| 3,602,032 | 8/1971 | Skintzis | 29/243.58 X |
| 3,665,580 | 5/1972 | Mashita | 29/243.56 |
| 3,829,954 | 8/1974 | Takamizawa et al. | 29/814 |
| 3,903,580 | 9/1975 | Lam | 29/818 |
| 4,827,591 | 5/1989 | Arnone | 29/243.56 |
| 4,981,245 | 1/1991 | Sato | 227/127 |

FOREIGN PATENT DOCUMENTS

| | | | |
|---|---|---|---|
| 772074 | 10/1934 | France | 29/243.56 |

OTHER PUBLICATIONS

Catalog Advertisement for "The Paper Gripper" (undated; one page).

*Primary Examiner*—Timothy V. Eley
*Assistant Examiner*—Khan V. Nguyen
*Attorney, Agent, or Firm*—Kilpatrick & Cody

[57] ABSTRACT

A non-piercing fastening device employing generally "V"-shaped clips is disclosed. The device contains a magazine channel into which one leg of each clip may be fitted and thereby snapped into place. The channel and its associated vertical walls additionally cause the vertices of the clips to act as a stop for papers or other objects to be fastened, enhancing the uniformity of the edges of the fastened papers. A rotating cam whose surface contacts substantially the entire length of the free leg of each clip is included to provide more constant pressure along and even crimping of the clip legs. The notched cam surface reduces the possibility of concurrently crimping multiple clips, and the cam can be adjusted automatically relative to the magazine's forwardmost clip to accommodate materials of varying thicknesses.

4 Claims, 3 Drawing Sheets

CLIP FASTENING DEVICE

This invention relates to fastening devices and more particularly to a mechanism and methods for clipping one or more objects (such as pieces of paper) together.

BACKGROUND OF THE INVENTION

Conventional paper clips are frequently used to bind sheets of paper temporarily. Such clips typically consist of a single linear piece of metal or plastic manipulated to form two interconnected, elongated loops. In use, the loops are separated slightly and a quantity of paper is inserted between them. Designed for manual operation, conventional paper clips are neither automatically dispensed nor automatically functional. Paper clips additionally tend to disengage from their associated papers under certain circumstances, diminishing their reliability as fasteners of, for example, the pages of important documents.

By contrast, existing staples are often employed to fasten pages of consequential documents, sometimes permanently. Like a paper clip, the staple is usually formed of a single linear piece of metal. Unlike the paper clip, however, the staple is initially patterned by creating two parallel legs depending perpendicularly from the opposite ends of a base. The staple legs are designed to penetrate the pertinent papers (at two locations) and then be curved, either inward or outward against the rear surface of the lowermost sheet, to retain the papers in place. Although mechanical staplers have been developed to dispense individual staples, the staples function as fasteners only by penetrating, and thereby necessarily damaging, the sheets. Accordingly, staples are rarely used to fasten fragile or delicate papers.

U.S. Pat. No. 4,981,245 to Sato discloses a hand-held stapler and an associated staple designed to pierce papers (typically slips and corrugated cardboard) at only one, rather than two, locations. The Sato patent also illustrates, in FIGS. 30 and 31, a "temporary" staple having three interconnected parts, designated the supporting portion, the projecting portion, and the stapling leg portion. According to that patent, by bending the edge of the stapling leg portion near the edge of the base paper, the supporting and stapling leg portions of the temporary staple can be used to clip the base paper to a slip without injuring the slip.

U.S. Pat. Nos. 3,279,046 to Shapiro and 3,665,508 to Mashita disclose other exemplary clipping devices. The Shapiro patent, for example, illustrates an apparatus designed to clip socks and other goods containing layers of fabrics. Utilizing a generally "C"-shaped clip fed into a pair of jaws or levers, the apparatus initially forces the clip toward the goods as the jaws close and then crimps the hook to form the substantially triangular structure shown in FIG. 9 of that patent. The Mashita patent similarly illustrates an applicator for generally "U"- or "C"-shaped clips, a portion of each of which is, in turn, contacted by a straight-edge press plate fitted into the applicator's handle.

SUMMARY OF THE INVENTION

The present invention provides a non-piercing fastening device as an alternative to existing applicators. Unlike the clipping apparatuses discussed above, however, the present invention employs a bar of generally "V"-shaped clips and contains a magazine channel into which one leg of each clip may be fitted. The vertical walls of the channel are sufficiently high to extend above at least a substantial portion of the vertices of the "V"-shaped clips, effectively locking the clips in the channel when inserted into the magazine. Doing so additionally causes the vertices of the clips to act as a stop for papers or other objects to be fastened, enhancing the uniformity of the edges of the fastened papers.

Also included in the device of the present invention is a rotating cam or other clip-dispensing means whose surface contacts essentially the entire length of the free leg of each clip when employed. Combined with the shape of the clips and the magazine channel, this cam surface produces more constant pressure along and even crimping of the clip legs than do the previously-disclosed applicators. The cam surface additionally includes a one-clip-wide slot, or notch, to reduce the likelihood of inadvertently concurrently crimping clips positioned adjacent the forwardmost clip within the magazine. To accommodate a wide range of thicknesses among the documents or other materials to be fastened, moreover, the cam itself can be adjusted automatically relative to the magazine's forwardmost clip.

An additional feature of the present invention includes spring-loading the cam and actuating knob along generally perpendicular axes. Other embodiments of the invention utilize a magnet instead of (or in addition to) a spring and follower to urge the bar of clips toward the cam. Yet other embodiments of the invention permit the actuating knob and associated block to pivot away from the clips and magazine, facilitating removal of jammed or defective clips from the magazine. The present invention, accordingly, is capable of securely fastening papers and other materials of varying quantities and thicknesses without damaging them through penetration of one or more staple legs. To detach the fastened papers, the "V"-shaped clip need merely be rotated approximately 90° (so that its legs are parallel to the edges of the papers); and which point it will disengage the papers and be available for disposal.

It is therefore an object of the present invention to provide a device for securely fastening papers or other materials without penetration.

It is another object of the present invention to provide a device producing constant pressure along and even crimping of the clip legs as the clips are dispensed.

It is an additional object of the present invention to provide a device in which a cam or other clip-dispensing means has a surface contacting substantially the entire length of the free end of each to-be-dispensed clip.

It is a further object of the present invention to provide a device in which the contact surface of the cam or other clip-dispensing means is slotted or notched.

It is, moreover, an object of the present invention to provide a device capable of accommodating documents or other to-be-fastened materials of varying thicknesses.

It is yet another object of the present invention to provide a device in which the cam or other clip-dispensing means can be adjusted relative to the forwardmost clip in the device's magazine.

It is an additional object of the present invention to provide a device employing "V"-shaped clips and having a magazine and associated channel walls functioning to lock the clips in the channel when snapped into the magazine.

Other objects, features, and advantages of the present invention will become apparent with reference to the remainder of the written portion and the drawings of this application.

DETAILED DESCRIPTION

Figure 1:
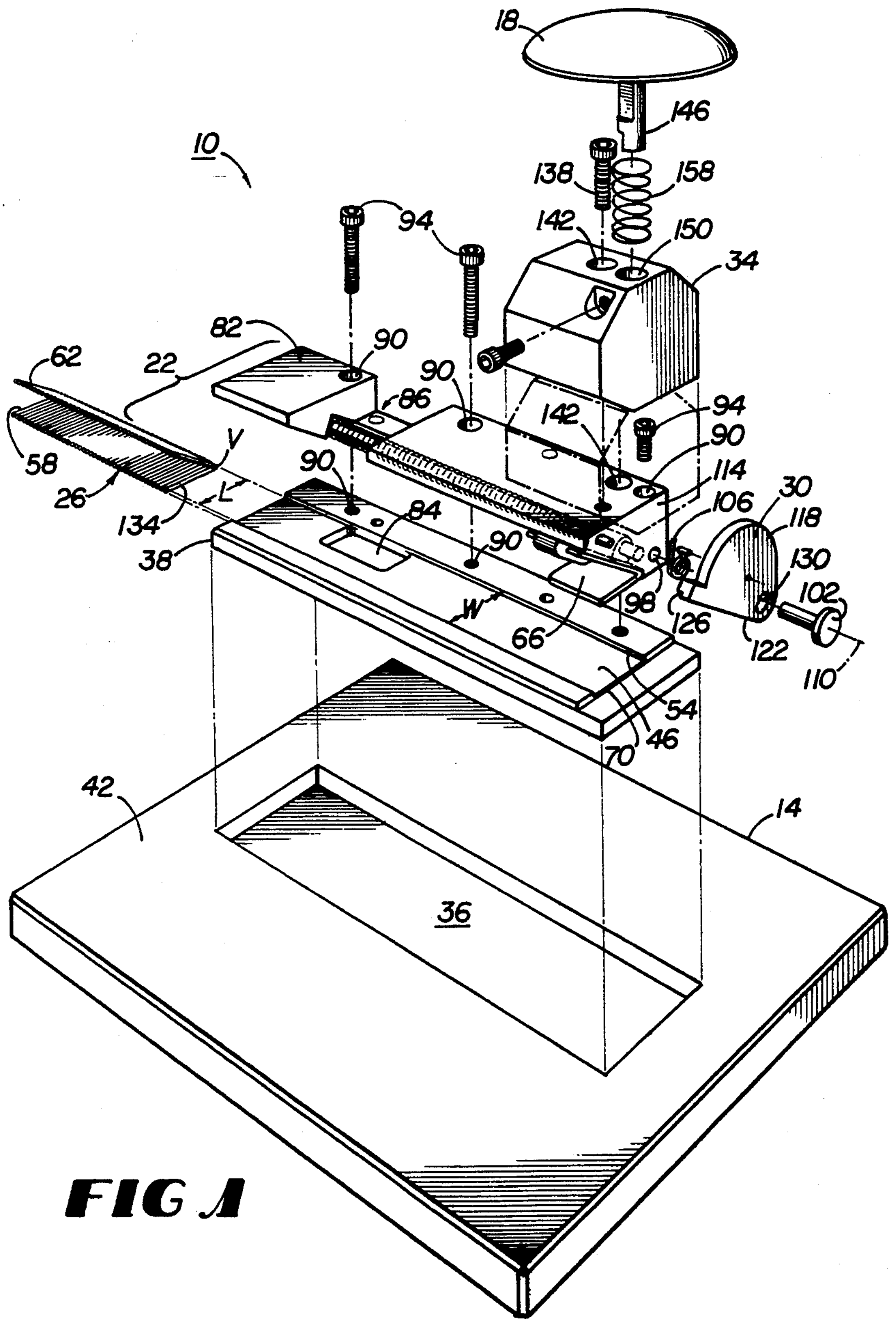
FIG. 1 is an exploded perspective drawing of a fastening device of the present invention.

FIGS. 1–6 illustrate device 10 of the present invention. Device 10 includes base 14, actuating knob 18, and magazine 22 for receiving one or more clips 26. Also shown in FIGS. 1–3 and 6 is cam 30, an exemplary clip-dispensing mechanism, and block 34 is included in FIGS. 1–4 and 6. Adapted to dispense individual clips 26 sequentially, device 10 securely binds multiple materials P (such as sheets of paper) without penetrating them as do staples and many other conventional fasteners.

Base 14, which may be made of metal, plastic, or any other suitable substance, contains recess 36 for receiving the lower portion 38 of magazine 22. Alternatively, base 14 and lower portion 38 may be formed integrally or the pertinent features of lower portion 38 may be machined, molded, or otherwise patterned in the upper surface 42 of base 14. As shown principally in FIG. 1, base 14 provides a sturdy support for embodiments of device 10, facilitating their use as desk-top or workbench fastening tools.

Lower portion 38 of magazine 22 itself includes a longitudinal recess, or channel 46, into which clips 26 may be placed. Channel 46, which defines front and rear walls 50 and 54, respectively, has a width W equal to the length L of the legs 58 and 62 of clips 26. Embodiments of the present invention consistent with FIGS. 1–6 contemplate legs 58 and 62 of each clip 26 being identical and connecting at vertex V. Consequently, in these embodiments clips 26 are reversible, and either legs 58 or legs 62 of a bar of clips 26 may be placed into channel 46.

As shown primarily in FIGS. 1–2 and 5–6, front and rear walls 50 and 54 are of sufficient height to envelop legs 58 and at least a substantial portion of vertices V of clips 26 within channel 46. When inserted into magazine 22, therefore, clips 26 can effectively snap into place and thereby be securely retained in channel 46. Uniformly ordering vertices V in this manner permits the vertices V to function as a stop, aligning the edges of the materials P to be fastened when introduced into device 10.

Follower 66 urges clips 26 toward the forward edge 70 of channel 46. Biased by spring 74, follower 66 is designed to contact the rear of a bar of clips 26 positioned within the channel 46. Spring 74, in turn, circumscribes and travels along shaft 78 in the upper portion 82 of magazine 22. Manually retracting follower 66 from forward edge 70 compresses spring 74, permitting clips 26 to be loaded into magazine 22. When retracted, follower 66 may additionally be rotated and temporarily fitted within notch 86 of upper portion 82 (see FIG. 5) to facilitate the loading process. Minor recess 84 of lower portion 38 provides additional clearance for follower 66 if necessary or desired.

Bores 90 in upper and lower portions 38 and 82 receive screws 94 for attaching these two segments of magazine 22. Although not shown in FIG. 1–6, bores 90 may extend into base 14 if necessary or desired to reinforce the connection between this component and magazine 22. Upper portion 82 of magazine 22 also comprises bore 98, located substantially parallel to shaft 78 and perpendicular to bores 90, into which pin 102 is fitted. Pin 102, together with its circumscribing spring 106, connects cam 30 to magazine 22 so that the cam 30 abuts the forward edge 70 of channel 46. Bore 98 additionally defines an axis 110 about which cam 30 rotates when in use, and spring 106 biases cam 30 away from the side 114 of upper portion 82 and toward upper surface 42 to permit smoother rotation of cam 30 about pin 102 and axis 110.

Figures 2, 3, 7:
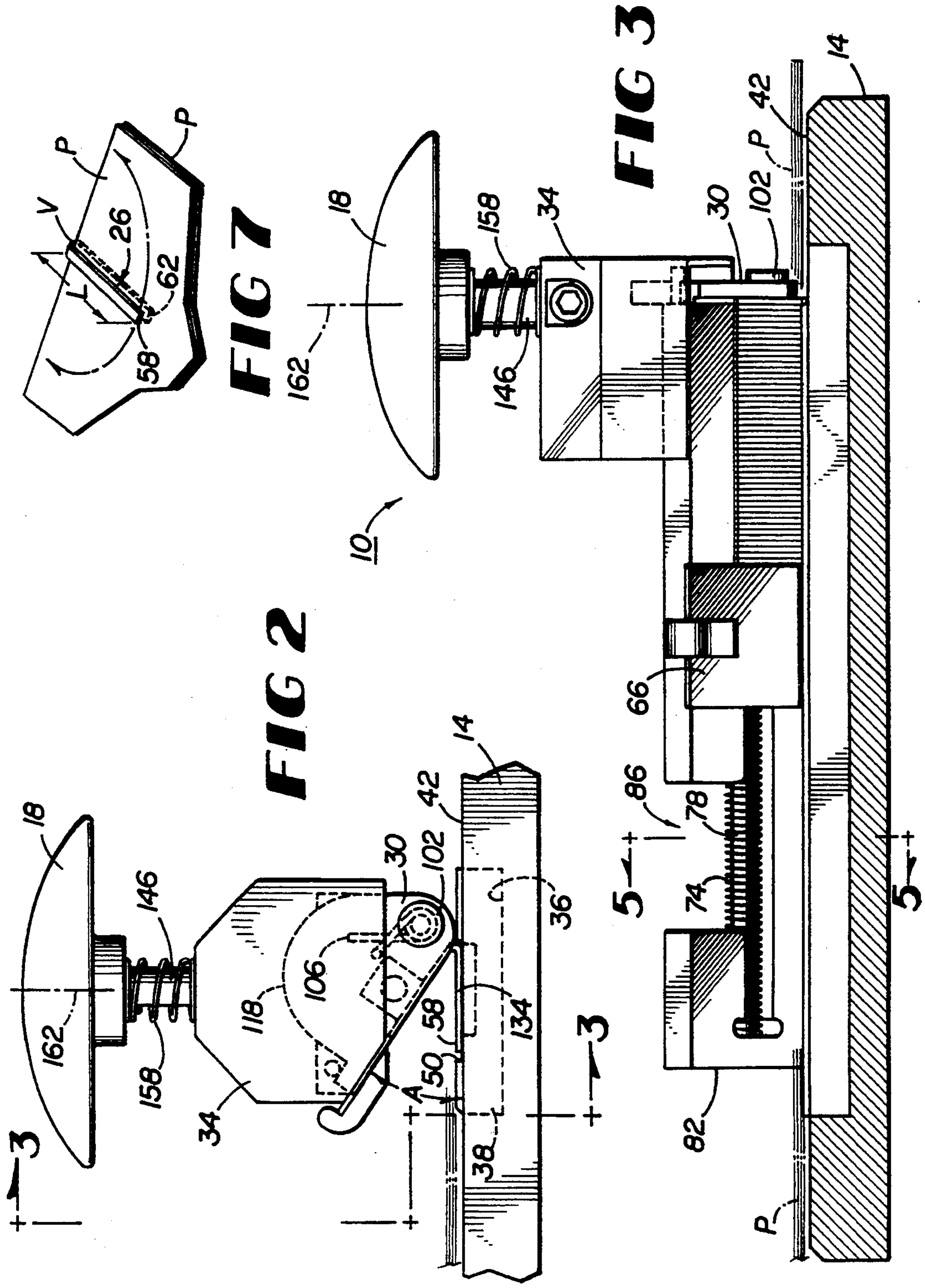
FIG. 2 is elevational view of the device of FIG. 1.
FIG. 3 is a cross-sectional view of the device of FIG. 1 taken along lines 3—3 of FIG. 2.
FIG. 7 is a perspective view of the sheets of paper as fastened during the operation of FIG. 6.
Figures 4, 5, 6:
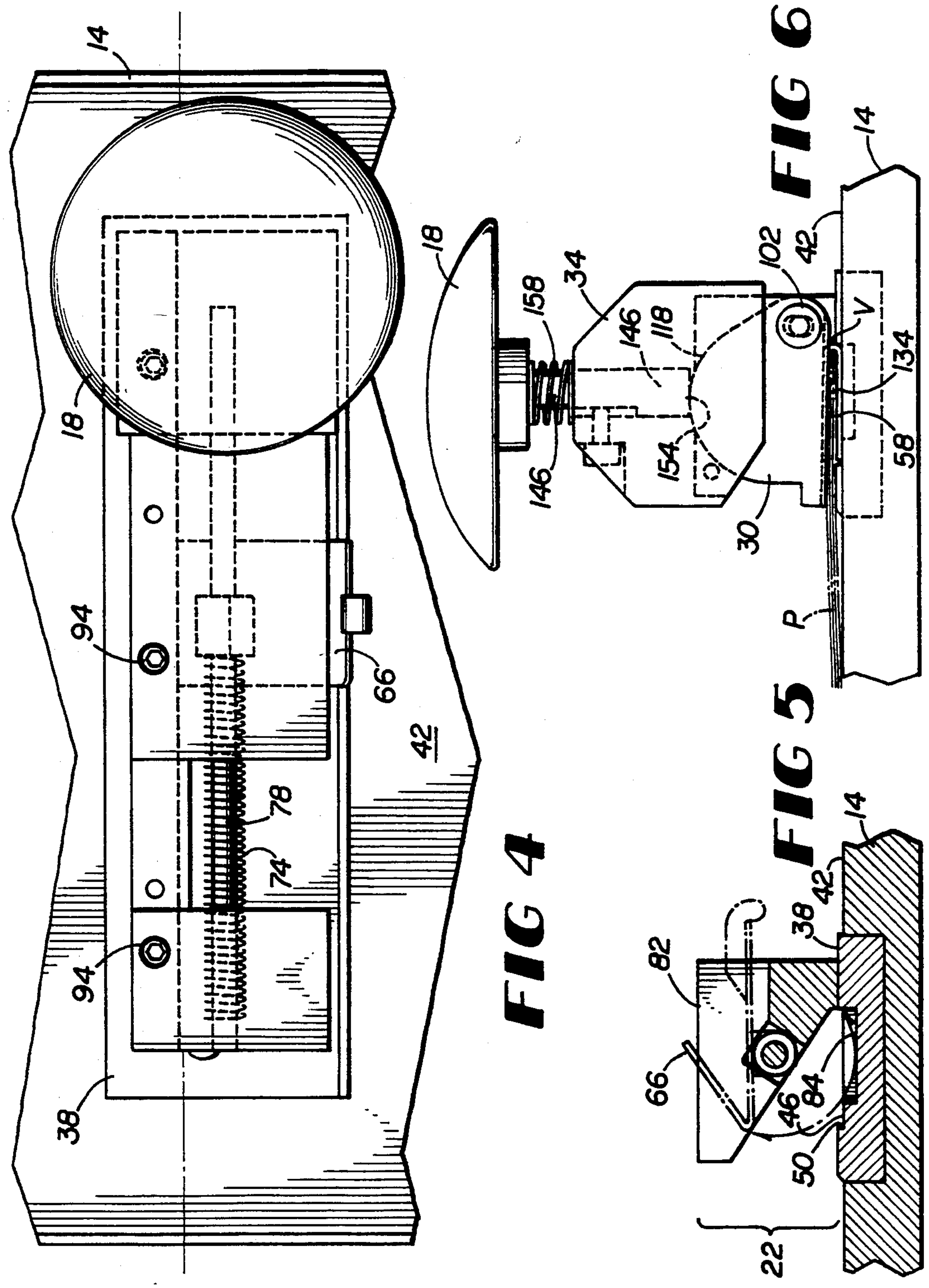
FIG. 4 is a top plan view of the device of FIG. 1.
FIG. 5 is a cross-sectional view of the device of FIG. 1 taken along line 5—5 of FIG. 3.
FIG. 6 is an elevational view of the device of FIG. 1 shown securely fastening multiple sheets of paper without penetration of the sheets.

As clearly illustrated in FIGS. 1–2 and 6, cam 30 includes a curved upper surface 118, a flat surface 122 with notch 126, and a transverse slot 130. In its unrotated position (FIGS. 1–2), flat surface 122 of cam 30 forms an acute angle A with upper surface 42 of base 14 approximately equal to the angle between legs 58 and 62 of clips 26. Urged forward by follower 66, the forwardmost clip 134 in magazine 22 engages notch 126, which stops the forward movement of clips 26 and correctly positions the forwardmost clip 134 for dispensing. Because flat surface 122 forms approximately the same angle with upper surface 42 and do the legs 58 and 62 of clips 26 about vertices V, the notch 126 of the flat surface 122 contacts substantially the entire length L of leg 62 of forwardmost clip 134. As a result, rotating cam 30 (see FIG. 6) places approximately uniform pressure against the whole length L of leg 62, more evenly crimping forwardmost clip 134 when dispensed.

Elongated transverse slot 130, which is larger than the diameter of pin 102, permits cam 30 to be adjusted relative to upper surface 42 of base 14 automatically when materials P are inserted into magazine 22. If materials P are abnormally thick, for example, cam 30 will translate slightly respecting axis 110 as it rotates. The value of angle A varies correspondingly, providing additional crimping force either nearer the vertex V of forwardmost clip 134 or farther from it. Adjusting cam 30 in this manner, therefore, permits device 10 to accommodate and fasten satisfactorily materials P of differing thicknesses.

Block 34 connects actuating knob 18 to upper portion 82 of magazine 22 using screw 138 and bores 142. Shaft 146, integrally formed with actuating knob 18, fits within bore 150 of block 34, thereby permitting end 154 of shaft 146 to abut upper surface 118. When actuating knob 18 is depressed, end 154 is forced against upper surface 118 to rotate cam 30 forward about axis 110. Spring 158 circumscribes shaft 146, biasing actuating knob 18 away from upper surface 118 along an axis 162 perpendicular to axis 110.

As explained throughout the foregoing description, operation of device 10 is straightforward. To load device 10 with a bar of clips 26, the user may initially retract follower 66 until it fits within notch 86, thereby exposing much of channel 46 (especially the portion of channel 46 adjacent forward edge 70). Holding the bar of clips 26, the user may then insert either legs 58 or legs 62 of clips 26 into channel 46, with vertices V contacting rear wall 54. This action effectively snaps clips 26 into place and retains them within channel 46 until each is dispensed. Following insertion of clips 26 into magazine 22, the user may disengage follower 66 from notch 86, thereby decompressing spring 74 and urging follower 66 against the rear of the bar of clips 26. Doing so advances forwardmost clip 134 into notch 126 of cam 30 and prepares it to be dispensed.

If desired, the user may then insert materials P into magazine 22 so that the edges of the materials P contact the interiors of the bar of clips 26 at vertices V and are thereby more closely aligned. Materials P are subsequently positioned between flat surface 122 of cam 30 and lower portion 38 of magazine 22 for fastening. With materials P so positioned, the user depresses actuating knob 18, thereby rotating cam 30. In turn, notch 126 of flat surface 122 is forced against leg 58 or leg 62 of forwardmost clip 134 (whichever it was engaged with). As cam 30 continues rotating, angle A decreases to approximately 0°, driving leg 58 or 62 against the upper surface of materials P and the lower surface of materials P against the other of leg 62 or 58. As a result, materials P are securely bound between legs 58 and 62 of forwardmost clip 134. Releasing pressure from actuating knob 18 returns cam 30 to its unrotated position and permits follower 66 to advance the next clip 66 to forward edge 70 of channel 46.

FIG. 7 illustrates a set of materials P fastened using device 10 and clip 26. Crimped between legs 58 and 62, materials P remain secure notwithstanding their lack of penetration by either leg 58 or leg 62. In contrast with the results achieved using conventional paper clips, the modest thickness of clip 26 permits sets of materials P fastened in the same area or corner to be stacked relatively flat. Similarly, unlike existing paper clips, clips 26 tend not to disengage when stacks of fastened materials P are disturbed or jostled. Merely by manually rotating clips 26 approximately 90° in either of the directions shown by the arrows in FIG. 7, however, clips 26 may be removed and materials P decoupled.

The foregoing is provided for purposes of illustration, explanation, and description of embodiments of the present invention. Modifications and adaptations to these embodiments will be apparent to those skilled in the art and may be made without departing from the scope and spirit of the invention.

I claim:

1. A device for securely fastening sets of materials between first and second legs of a clip, each of which sets of materials has a thickness that may differ from set to set and each of which first and second legs has a predetermined length, comprising:

a. a magazine defining a bore and a channel for receiving the first leg of the clip, which channel has a width equal to the length of the first leg;

b. means, comprising a rotatable cam having a slot defining a desired position-adjustment dimension and having a notch adapted to engage substantially the length of the second leg, for compressing the clip against one of the sets of materials;

c. means for actuating the compressing means; and d. means for accommodating the differing thicknesses of the sets of materials, comprising a pin that:

i. connects the cam to the magazine;

ii. is received by the slot and bore and about which the cam rotates; and iii. has a diameter less than the position-adjustment dimension of the slot, thereby permitting the cam to adjust its position with respect to the thickness of the set of materials as the cam rotates.

2. A device according to claim 1 in which the cam has a flat surface defining the notch and a curved surface contacting the actuating means.

3. A device according to claim 2 in which the actuating means comprises a knob having an integrally-formed shaft for contacting the curved surface of the cam.

4. A device for securely fastening materials between first and second legs of a generally V-shaped clip, which first and second legs have predetermined lengths and widths, comprising:

a. a lower magazine segment defining a channel for receiving the first leg of the clip, which channel has a width equal to the length of the first leg;

b. an upper magazine segment connected to the lower magazine segment, having a length, and defining:

i. a first bore; and ii. a notched region;

c. a shaft positioned within the upper magazine segment;

d. a first spring circumscribing the shaft;

e. a follower attached to the first spring and adapted to contact the clip when the device is in use and to be fitted within the notched region of the upper magazine segment when the clip is being received by the channel;

f. a rotating cam defining:

i. a curved surface;

ii. a flat surface having a notch whose width is approximately that of the width of the second leg; and iii. an elongated slot having a desired position-adjustment dimension;

g. a pin, having a diameter less than the position-adjustment dimension of the elongated slot, passing through the elongated slot into the first bore to connect the rotating cam to the upper magazine segment;

h. a second spring interposed between the upper magazine segment and the rotating cam and circumscribing the pin;

i. a block connected to the upper magazine segment and defining a second bore; and j. an actuating assembly, comprising:

i. a knob;

ii. an actuating shaft connected to the knob, received by the second bore, and adapted to contact the curved surface of the rotating cam; and iii. a third spring circumscribing the actuating shaft and contacting the block.

* * * * *